E. J. BLACKMON.
COTTON CLEANING AND EXTRACTING MACHINE.
APPLICATION FILED SEPT. 4, 1918.

1,320,527.

Patented Nov. 4, 1919.

Inventor.
Enoch J. Blackmon.
By
J. P. Dederick.
Attorney.

UNITED STATES PATENT OFFICE.

ENOCH J. BLACKMON, OF SHERMAN, TEXAS.

COTTON CLEANING AND EXTRACTING MACHINE.

1,320,527.  Specification of Letters Patent.  Patented Nov. 4, 1919.

Application filed September 4, 1918. Serial No. 252,522.

*To all whom it may concern:*

Be it known that I, ENOCH J. BLACKMON, a citizen of the United States, residing at Sherman, in the county of Grayson and State of Texas, have invented certain new and useful Improvements in Cotton Cleaning and Extracting Machines, of which the following is a specification.

This invention comprehends certain new and useful improvements in boll cotton cleaning and extracting machines, it may be used for extracting lint cotton from crushed, closed bolls, or for reginning and removing the cotton remaining in the burs, and hence wasted, when ginned by the machines now employed. The successful operation of such machines depends, to a very large extent, on the regulation of the feed of the hulls and cotton to the saw cylinder, and also very materially, in enabling the hulls when cleaned of cotton, to be thrown at once from contact with the saws, and continuously so removed from the machine before their disintegration and the particles thereof mixed with the cotton lint.

This machine is not intended for use in ginning hand picked cotton, but when the weather in the fall reaches the freezing point, there is, as a general thing vast quantities of cotton in matured condition in partly opened bolls on the stalks, which at this time of the year lose their opening power on account of becoming frozen. Under the circumstances the cotton cannot be picked from them by hand, but may be gathered in the bolls, and with my machine the lint may be extracted, producing a sample but little inferior to that of hand picked cotton. Some ginning establishments are equipped with boll crushing devices and gins that enable them to extract a large portion of cotton from the bolls, but after being thus operated upon there is quite a percentage of lint still adhering to the hulls, and it is an object of this invention to regin said ginned bolls and secure the lint remaining therein.

With the above stated purposes in view the invention consists essentially in a cotton cleaning and extracting machine comprising a vibratory shaker coöperating with a rotary feeding mechanism, a rotating saw cylinder, and a rotary pod expeller coöperating therewith.

Figure 1:
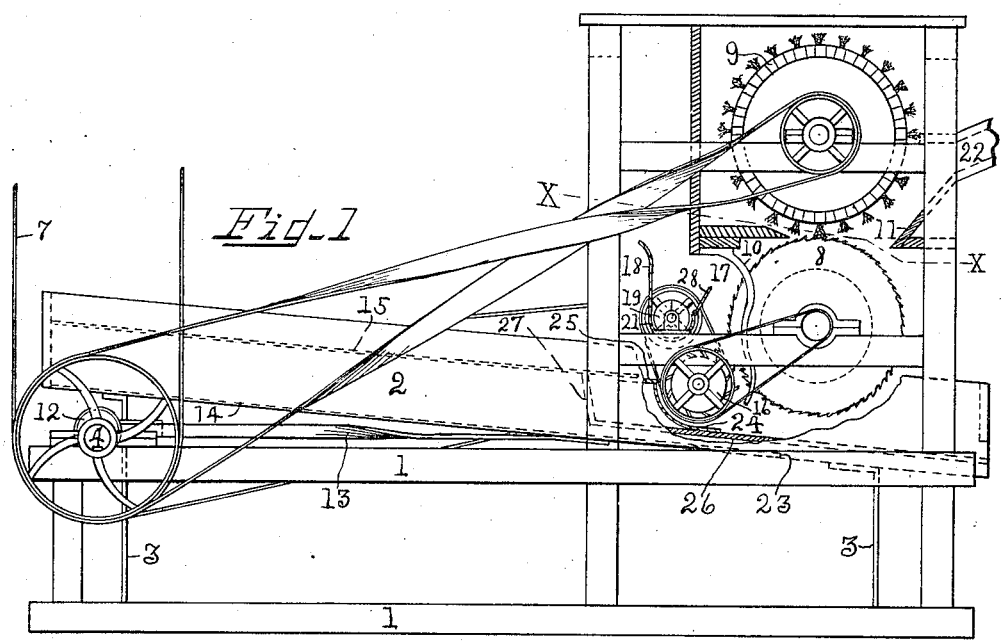
Figure 2:
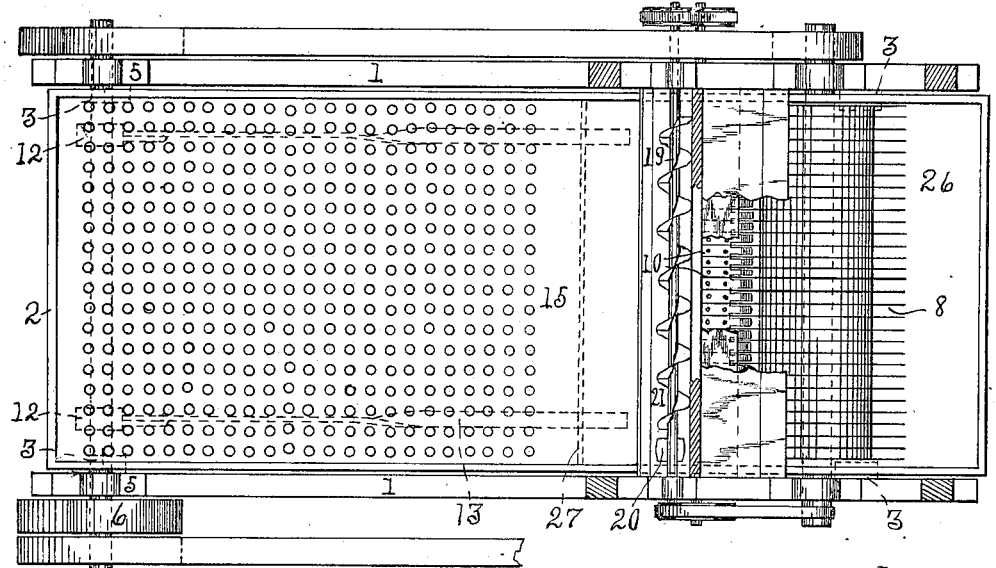

An embodiment of this invention is disclosed in the structure shown in the accompanying drawings wherein like characters of reference indicate corresponding parts in both of the views, and in which, Figure 1, is a side elevation partly in section of a mechanism constructed in accordance with my invention; and Fig. 2 is a plan view through the line $xx$ of Fig. 1.

Referring more particularly to the drawings, the various fixed instrumentalities herein described are mounted upon a rectangular framework 1, between the sides of which is located a longitudinally inclined shaker 2, supported at either end on pairs of springs 3 connected at their upper ends to the shaker bottom, and at their lower ends to the sill portions of the frame. A main drive shaft 4 is mounted in journals 5, at one end of the frame, and carries a pulley 6 from which a belt 7 may extend to any suitable source of power. A saw cylinder 8 is mounted at the opposite end of the frame and is driven in the usual manner, also a doffer brush 9 for removing lint from the saws. Ginning ribs 10 and mote board 11 are also employed. Eccentrics 12 are secured to the shaft 4, and from the straps thereof, flat steel springs 13 extend toward the opposite end of the shaker and are secured to the bottom thereof. Revolving of the eccentrics imparts to the shaker pan a reciprocating movement. The shaker has a sheet metal bottom 14, and located above it is a perforated screen 15. Crushed boll cotton to be ginned is deposited by any convenient means upon the upper inclined end of this screen, and the vibratory motion causes it to gradually pass down the incline to a suitably journaled feed roller 16, that feeds it to the revolving gin saws. It thus occurs that all pieces of hulls having cotton adhering to them will be engaged by the saws, and continue to be so engaged until all the cotton is removed from them, while the hulls from which the cotton has been removed will be knocked outward by the rapidly revolving saws, through the space 17, to the deflector 18 and fall by gravity to the conveyer 19, which conducts them out of the machine through an opening 20, at the bottom of the conveyer trough 21, the lint cotton being discharged through the opening 22, practically entirely free from hull particles and other refuse matter.

As the cotton bolls pass down the screen 15, more or less dirt will pass through the perforations therein and be deposited upon the bottom 14, down which it will continue to the end 23, where it falls to the floor, or may be conducted to any suitable receptacle. A stationary partial casing 24 surrounding the lower portion of the feed wheel 16, and adjacent thereto, and provided with a transverse wall 25 upon which the lower inclined end of the screen 15 rests, insures the passage of the hulls over the feed wheel to the saws. A short bottom 26, transversely disposed in the shaker and having an upright portion 27 extending to the screen 15, passes beneath the feed roller 16 and saw cylinder; all dirt shaken from the burs in their passage over the feed roller, and while being acted upon by the saws will fall upon it and be conducted out of the shaker. To the conveyer trough 21 is hinged a baffle 28, extending parallel therewith throughout the length of the trough, and is adjusted to provide a space between it and the saw cylinder sufficiently wide to permit the discharge of all cleaned hulls, and to prevent their passage from the saws until the lint cotton is thoroughly removed.

From the foregoing description, taken in connection with the accompanying drawings, the construction and operation of the invention will be readily understood without requiring a more extended explanation.

Having thus described my invention, what I claim as new and desire to secure by Letters Patent of the United States is—

In a machine of the class described, in combination with a rotary saw cylinder, a shaker adapted to feed cotton to a partially incased feed roller, said roller positioned to feed cotton to the gin saws, a bottom beneath the roller adapted to conduct refuse matter from the shaker, a conveyer trough having an upwardly extended fixed baffle and an adjustable baffle positioned above the roller, and a spiral conveyer in the trough for removing cotton burs thrown in the trough by the revolution of the saws.

In testimony whereof I affix my signature.

E. J. BLACKMON.

Copies of this patent may be obtained for five cents each, by addressing the "Commissioner of Patents, Washington, D. C."